United States Patent
Ye

(10) Patent No.: US 9,860,805 B2
(45) Date of Patent: Jan. 2, 2018

(54) DEVICE OF HANDLING ENERGY DETECTION IN UNLICENSED BAND

(71) Applicant: HTC Corporation, Taoyuan (TW)

(72) Inventor: Shiang-Rung Ye, Taoyuan (TW)

(73) Assignee: HTC Corporation, Taoyuan (TW)

( * ) Notice: Subject to any disclaimer, the term of this patent is extended or adjusted under 35 U.S.C. 154(b) by 94 days.

(21) Appl. No.: 14/958,846

(22) Filed: Dec. 3, 2015

(65) Prior Publication Data

US 2016/0165474 A1 Jun. 9, 2016

Related U.S. Application Data

(60) Provisional application No. 62/087,724, filed on Dec. 4, 2014.

(51) Int. Cl.
 *H04W 36/00* (2009.01)
 *H04W 72/08* (2009.01)
 *H04W 16/14* (2009.01)

(52) U.S. Cl.
 CPC ..... *H04W 36/0088* (2013.01); *H04W 72/085* (2013.01); *H04W 16/14* (2013.01)

(58) Field of Classification Search
 CPC ........... H04W 36/0088; H04W 72/085; H04W 16/14
 See application file for complete search history.

(56) References Cited

U.S. PATENT DOCUMENTS

| | | | | |
|---|---|---|---|---|
| 2006/0159003 A1* | 7/2006 | Nanda | ................... | H04W 16/10 370/203 |
| 2010/0079463 A1* | 4/2010 | Rabin | ................... | G06T 11/206 345/440 |
| 2013/0010774 A1* | 1/2013 | Subramanian | .... | H04W 74/0808 370/338 |
| 2013/0176856 A1* | 7/2013 | Wang | ................ | H04W 74/0808 370/241 |
| 2013/0208604 A1* | 8/2013 | Lee | ...................... | H04L 25/0226 370/252 |
| 2015/0215903 A1* | 7/2015 | Zhao | ...................... | H04W 72/04 370/329 |
| 2015/0373652 A1* | 12/2015 | Dabeer | ............... | H04W 52/246 455/522 |
| 2016/0007350 A1* | 1/2016 | Xiong | ................... | H04W 24/10 370/252 |
| 2016/0057770 A1* | 2/2016 | Yerramalli | ........... | H04B 7/0811 370/329 |
| 2017/0041803 A1* | 2/2017 | Shi | ...................... | H04W 72/085 |

* cited by examiner

*Primary Examiner* — Habte Mered
(74) *Attorney, Agent, or Firm* — Winston Hsu

(57) ABSTRACT

A communication device comprises a storage unit for storing instructions and a processing means coupled to the storage unit. The processing means is configured to execute the instructions stored in the storage unit. The instructions comprise detecting energy of a set of subcarriers in an unlicensed band; obtaining a value according to a statistical function of the energy; and transmitting a report comprising the value to a network.

15 Claims, 3 Drawing Sheets

DEVICE OF HANDLING ENERGY DETECTION IN UNLICENSED BAND

CROSS REFERENCE TO RELATED APPLICATIONS

This application claims the benefit of U.S. Provisional Application No. 62/087,724, filed on Dec. 4, 2014 and incorporated herein by reference.

BACKGROUND OF THE INVENTION

1. Field of the Invention

The present invention relates to a communication device used in a wireless communication system, and more particularly, to a communication device of handling energy detection in an unlicensed band in a wireless communication system.

2. Description of the Prior Art

A long-term evolution (LTE) system supporting the 3rd Generation Partnership Project (3GPP) Rel-8 standard and/or the 3GPP Rel-9 standard are developed by the 3GPP as a successor of the universal mobile telecommunication system (UMTS) for further enhancing performance of the UMTS to satisfy increasing needs of users. The LTE system includes a new radio interface and a new radio network architecture that provides high data rate, low latency, packet optimization, and improved system capacity and coverage. In the LTE system, a radio access network known as an evolved universal terrestrial radio access network (E-UTRAN) includes at least one evolved Node-B (eNB) for communicating with at least one user equipment (UE), and for communicating with a core network including a mobility management entity (MME), a serving gateway, etc., for Non-Access Stratum (NAS) control.

A LTE-advanced (LTE-A) system, as its name implies, is an evolution of the LTE system. The LTE-A system targets faster switching between power states, improves performance at the coverage edge of an eNB, increases peak data rate and throughput, and includes advanced techniques, such as carrier aggregation (CA), coordinated multipoint (CoMP) transmissions/reception, uplink (UL) multiple-input multiple-output (UL-MIMO), licensed-assisted access (LAA) using LTE, etc. For a UE and an eNB to communicate with each other in the LTE-A system, the UE and the eNB must support standards developed for the LTE-A system, such as the 3GPP Rel-10 standard or later versions.

Network operators propose to offload network traffic of the LTE/LTE-A system to an unlicensed band, to ease load of the network traffic. For example, the eNB may provide services to the UE via the unlicensed band. However, resource in the unlicensed band is not always available, and it is not easy for the eNB to allocate the resource in the unlicensed band. The operations in the unlicensed band are even more complicated, when the UE operates in both a licensed band and the unlicensed band.

However, the unlicensed band may be used by other devices at the same time. An eNB, a UE and the devices using the same unlicensed band may interfere with each other, if transmissions are performed without considering operations of other devices. The performances of the eNB, the UE and the devices are degraded, and the benefit of the usage of the unlicensed band is diminished.

Thus, how to avoid the interference in the unlicensed band is an important problem to be solved.

SUMMARY OF THE INVENTION

The present invention therefore provides devices for handling energy detection in an unlicensed band to solve the abovementioned problem.

A communication device comprises a storage unit for storing instructions and a processing means coupled to the storage unit. The processing means is configured to execute the instructions stored in the storage unit. The instructions comprise detecting energy of a set of subcarriers in an unlicensed band; obtaining a value according to a statistical function of the energy; and transmitting a report comprising the value to a network.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
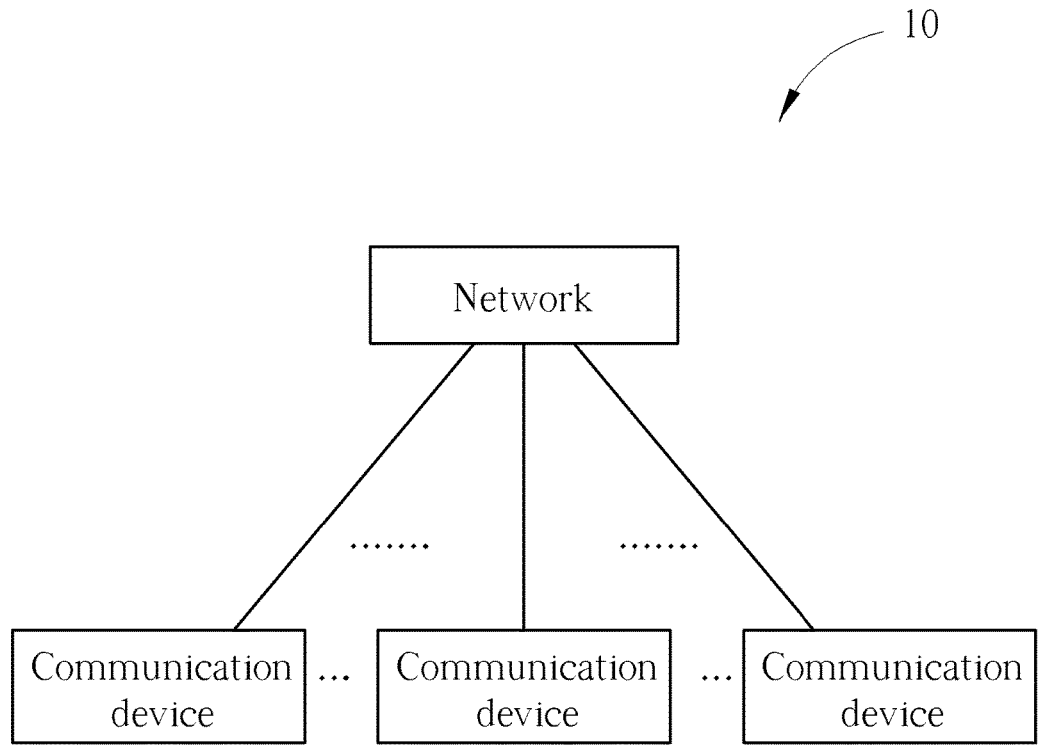
FIG. 1 is a schematic diagram of a wireless communication system according to an example of the present invention.

Please refer to FIG. 1, which is a schematic diagram of a wireless communication system 10 according to an example of the present invention. The wireless communication system 10 is briefly composed of a network and a plurality of communication devices. The network and a communication device may communicate with each other via one or more carriers of licensed band(s) and/or unlicensed band(s). The network and the communication device may simultaneously communicate with each other via multiple cells (e.g., multiple carriers) including a primary cell (e.g., primary component carrier (CC)) and one or more secondary cells (e.g., secondary component carriers). The abovementioned cells may be operated in the same or different duplexing modes, i.e. frequency-division duplexing (FDD) and time-division duplexing (TDD). For example, the primary cell may be operated on licensed carrier(s), while the secondary cell may be operated on unlicensed carrier(s).

In FIG. 1, the network and the communication devices are simply utilized for illustrating the structure of the wireless communication system 10. Practically, the network may be an evolved UTRAN (E-UTRAN) including at least one evolved NB (eNB) and/or at least one relay in a long term evolution (LTE) system, a LTE-Advanced (LTE-A) system or an evolution of the LTE-A system. The eNB or the relay may be termed as a base station.

A communication device may be a user equipment (UE), a low cost device (e.g., machine type communication (MTC) device), a device-to-device (D2D) device, a mobile phone, a laptop, a tablet computer, an electronic book, a portable computer system, a vehicle, airplane or combination thereof. In addition, the network and the communication device can be seen as a transmitter or a receiver according to direction (i.e., transmission direction), e.g., for an uplink (UL), the communication device is the transmitter and the network is the receiver, and for a downlink (DL), the network is the transmitter and the communication device is the receiver.

Figure 2:
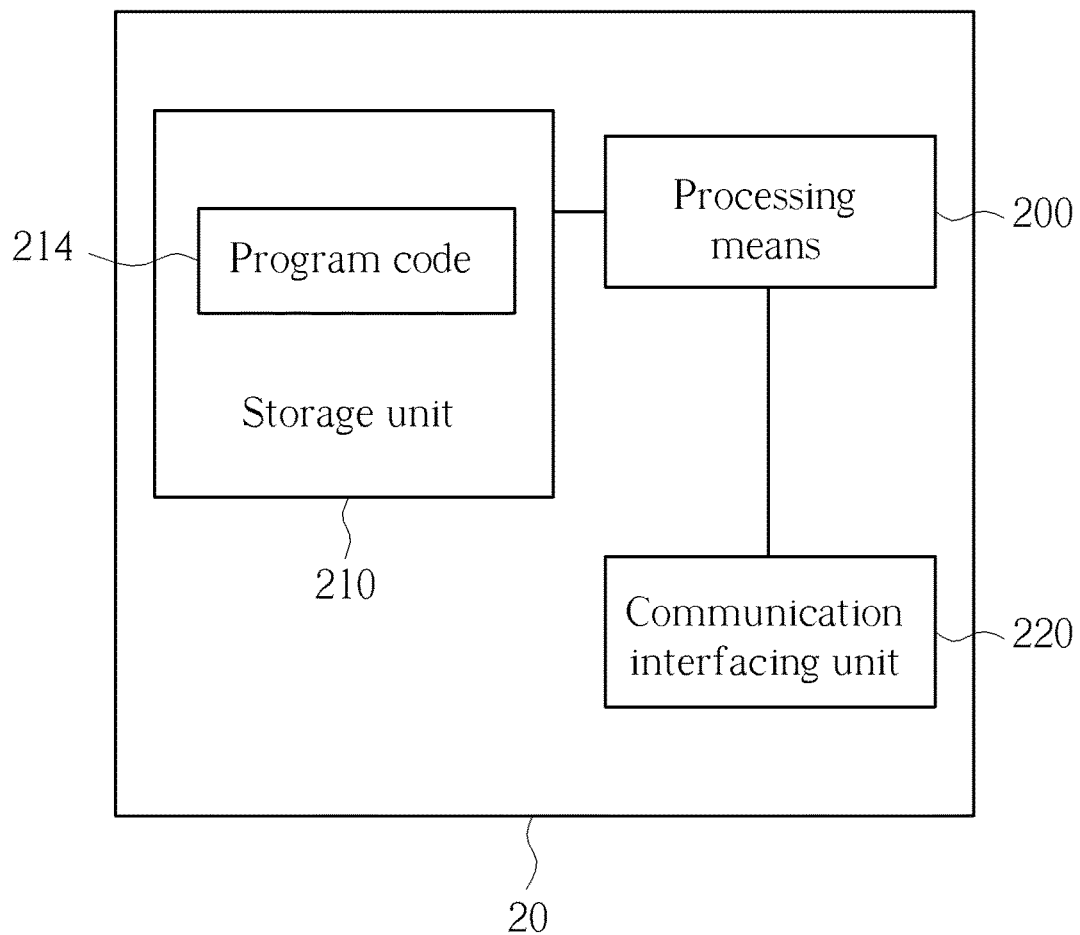
FIG. 2 is a schematic diagram of a communication device according to an example of the present invention.

FIG. 2 is a schematic diagram of a communication device 20 according to an example of the present invention. The communication device 20 may be a communication device or the network shown in FIG. 1, but is not limited herein. The communication device 20 may include a processing means 200 such as a microprocessor or Application Specific Integrated Circuit (ASIC), a storage unit 210 and a communication interfacing unit 220. The storage unit 210 may be any data storage device that may store a program code 214, accessed and executed by the processing means 200. Examples of the storage unit 210 include but are not limited to a subscriber identity module (SIM), read-only memory (ROM), flash memory, random-access memory (RAM), Compact Disc Read-Only Memory (CD-ROM), digital versatile disc-ROM (DVD-ROM), Blu-ray Disc-ROM (BD-ROM), magnetic tape, hard disk, optical data storage device, non-volatile storage unit, non-transitory computer-readable medium (e.g., tangible media), etc. The communication interfacing unit 220 is preferably a transceiver and is used to transmit and receive signals (e.g., data, messages and/or packets) according to processing results of the processing means 200.

For the sake of simplicity, a UE and an eNB in the following examples are used for illustrating the communication device and the network, respectively. It should be noted that the scope of the invention is not limited thereto.

Figure 3:
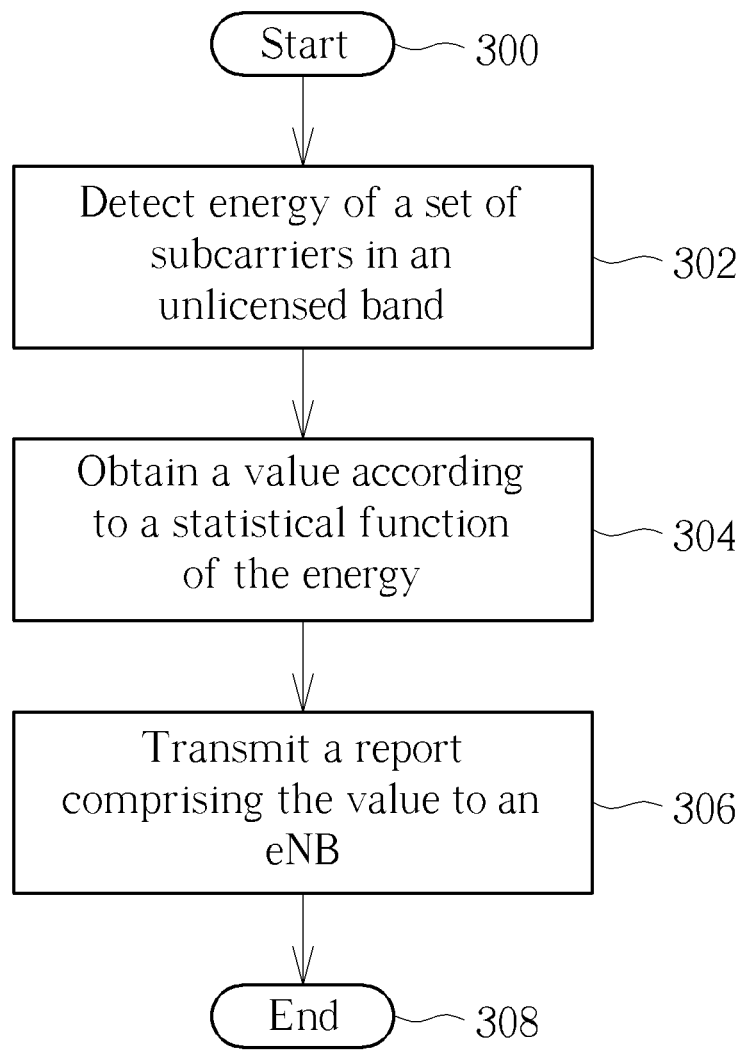
FIG. 3 is a flowchart of a process according to an example of the present invention.

FIG. 3 is a flowchart of a process 30 according to an example of the present invention. The process 30 may be utilized in a UE (e.g., the communication device in FIG. 1), to handle energy detection in an unlicensed band. The process 30 may be compiled into the program code 214 and includes the following steps:

Step 300: Start.

Step 302: Detect energy of a set of subcarriers in an unlicensed band.

Step 304: Obtain a value according to a statistical function of the energy.

Step 306: Transmit a report comprising the value to an eNB.

Step 308: End.

According to the process 30, the UE may detect energy of a set of subcarriers in an unlicensed band. Then, the UE may obtain a value (e.g., statistical value) according to a statistical function of the energy, and may transmit a report comprising the value to an eNB. That is, the statistical function may be used for processing the detected energy, and the resulted value is transmitted in the report to the eNB. Thus, the eNB may perform resource allocation (e.g., scheduling) for the unlicensed band according to the value transmitted by the UE. As a result, interference in the unlicensed band can be reduced, and throughout of devices operated in the unlicensed band can be improved.

Realization of the process 30 is not limited to the above description.

In one example, the eNB may configure the UE with the set of subcarriers for an UL transmission. In one example, if the number of the set of subcarriers is greater than one, the average or the sum of the energy of the set of subcarriers may be used as the detected energy. In one example, the eNB may configure the UE with the set of subcarriers for a DL transmission. In one example, the set of subcarriers may be predetermined for a bandwidth at a carrier frequency in the unlicensed band. Further, the carrier frequency may be designated by an Evolved Universal Terrestrial Radio Access Network (EUTRA) Absolute Radio Frequency Channel Number (EARFCN). In one example, the set of subcarriers may belong to an EARFCN configured by the eNB, and the set of subcarriers may span a bandwidth of the EARFCN. In other words, the eNB may configure the UE to detect the energy of the bandwidth of the EARFCN.

In one example, the eNB may configure a first periodicity and a second periodicity to the UE, for the UE to detect energy periodically according to one of the first periodicity and the second periodicity. In another example, the first periodicity and the second periodicity may be predetermined. Further, the first periodicity may be M times greater than the second periodicity, where M is a positive integer. In one example, the second periodicity may be applied for detecting the energy, when the UE starts to detect the energy on a set of subcarriers. After collecting N results of the energy detections by applying the second periodicity, the UE may apply (i.e., switch to) the first periodicity for detecting the energy on the set of subcarriers. In another example, if the UE has no ongoing data transmission, the UE may apply the first periodicity for detecting the energy. If the UE has an ongoing data transmission, the UE may apply the second periodicity for detecting the energy. Further, the UE may consider that there is an ongoing data transmission, if the UE receives an UL grant requesting a new transmission. In one example, the UE may consider that there is no ongoing data transmission, if the number of retransmissions reaches a maximum value. In one example, if the UE receives a DL data, the UE may apply the second periodicity for detecting the energy, and starts a timer. If the timer expires, the UE may apply (i.e., switch to) the first periodicity for detecting the energy. If the UE receives a DL data when the timer is running, the timer is restarted.

In one example, a rate (e.g., the number of detections per second) according to which the UE performs energy detection may be predetermined or configured by eNB. In one example, a subframe may be divided into one or more detecting slots, when performing the energy detection. In one example, if an UL (e.g., signal, data) transmission collides with the energy detection, the UE may proceed to the UL transmission. That is, a priority of the UL transmission is higher than a priority of the energy detection. Accordingly, the energy detection may be deferred to a next available detecting slot. In one example, the eNB may configure a time interval in which the eNB will not transmit DL data via a serving cell. Accordingly, the UE is able to perform the energy detection for another set of subcarriers in other carrier frequencies (e.g., another unlicensed band) in the time interval. In one example, the eNB may configure the UE with one or more periodicities for detecting the energy. In other words, the eNB may configure the UE with one or more rates for detecting the energy.

In one example, the UE may compute a value u for the set of subcarriers according to a statistical function, after detecting the energy of the set of subcarriers. In one example, the eNB may configure the UE with a threshold via a broadcast message (e.g., System Information Block (SIB)) or a dedicated message (e.g., RRCConnectionReconfiguration). In one example, the value after x-th energy detection may be obtained by applying a moving average function to a variable r (e.g., the detected energy in the process 30): $u(x)=a*u(x-1)+1-a)*r(x)$, where the variable r may be the detected energy (e.g., in dB or dBm), and u is the moving averaging energy. The coefficient a may be configured by eNB, and is between 0 and 1. In one example, if the energy during a detecting slot is greater than the threshold, the variable r may be assigned a value (e.g., 1). Otherwise, if the energy is lower than the threshold, the variable r may be assigned another value (e.g., 0). In one example, after the UE handovers to another cell (e.g., a primary cell (PCell) of the UE is changed to another cell), the UE may reset the value for the set of subcarriers. In one example, after the UE performs a cell selection/reselection, the UE may reset the value for the set of subcarriers. In one example, after the UE leaves a RRC connected mode, the UE may keep the value for the set of subcarriers if the UE selects to the same previous PCell.

In one example, after collecting Z results by performing energy detections, the UE may start to determine if an event occurs afterward. The eNB may configure the value Z to the UE the Z via a broadcast message (e.g., SIB) or a dedicated message (e.g., RRCConnectionReconfiguration).

In one example, the eNB may configure the UE with a measurement identity, a threshold and a set of subcarriers via dedicated message(s) (e.g., RRCConnectionReconfiguration). If a value obtained according a statistical function of energy detection for the set of subcarriers is greater than the threshold, the UE transmit a report to the eNB. The report may include the measurement identity and/or the value. In one example, after receiving the report, the eNB may configure the UE to release the measurement identity such that the UE will not perform the energy detection on the set of subcarriers. In one example, after receiving the report, the eNB may configure the UE to release a secondary cell (SCell) associated with the set of subcarriers. In one example, after receiving the report, the eNB may transmit a medium access control (MAC) control element to deactivate the SCell associated with the set of subcarriers.

In one example, the eNB may configure the UE with a measurement identity, a threshold and a set of subcarriers via broadcast message(s) (e.g., SIB) or dedicated message(s) (e.g., RRCConnectionReconfiguration). In one example, if a value obtained according a statistical function of energy detection for the set of subcarriers is lower than the threshold and the UE is in a RRC connected mode, the UE transmits a report to the eNB. The report may include the measurement identity and/or the value. In one example, the UE may detect energy on the set of subcarriers in a RRC idle mode. After the UE establishes a RRC connection to the eNB, if the value for the set of subcarriers is still lower than the threshold and the eNB enquires UE about the information (e.g. via RRCConnectionSetup with a bit requesting that), the UE transmits the report to the eNB (e.g. via UEAssistanceInformation). The report may include the measurement identity and/or the value.

In one example, the eNB may configure the UE with a measurement identity, an offset and a set of subcarriers S1 via dedicated message(s) (e.g., RRCConnectionReconfiguration). If a value obtained according a statistical function of energy detection for the set of subcarriers S1 is greater than a value obtained according the statistical function of energy detection for another set of subcarriers S2 plus the offset, the UE transmits a report to the eNB. The report may include the measurement identity, the value for the set of subcarriers S1, the set of subcarriers S2, and/or the value for the set of subcarriers S2. In one example, after receiving the report, the eNB may configure the UE to release the measurement identity such that the UE will not perform the energy detection on the set of subcarriers S1. In one example, after receiving the report, the eNB may configure the UE to release the SCell associated with the set of subcarriers S1. In one example, after receiving the report, the eNB may transmit a MAC control element to deactivate the SCell associated with the set of subcarriers S1.

In one example, the eNB may configure the UE with a measurement identity, a first threshold, a second threshold, a set of subcarriers S1 via dedicated message(s) (e.g., RRCConnectionReconfiguration). If a value obtained according a statistical function of energy detection for the set of subcarriers S1 is lower than the first threshold and a value obtained according the statistical function of energy detection for another set of subcarriers S2 is greater than the second threshold, the UE transmits a report to the eNB. The report may include the measurement identity, the value for the set of subcarriers S1, the set of subcarriers S2, and/or the value for the set of subcarriers S2. In one example, after receiving the report, the eNB may configure the UE to release the measurement identity such that the UE will not perform the energy detection on the set of subcarriers S1. In one example, after receiving the report, the eNB may configure the UE to release the SCell associated with the set of subcarriers S1. In one example, after receiving the report, the eNB may transmit a MAC control element to deactivate the SCell associated with the set of subcarriers S1.

In above examples, if an event occurs and holds for a period of time, the UE may transmit the report to the eNB. The period of time may be configured by the eNB or may be predetermined.

It should be noted that although the examples are illustrated based on the process 30, to clarify the operations of the communication device. The examples can be combined and/or modified arbitrarily according to system requirements and/or design considerations.

Those skilled in the art should readily make combinations, modifications and/or alterations on the abovementioned description and examples. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20.

Examples of the hardware may include analog circuit(s), digital circuit(s) and/or mixed circuit(s). For example, the hardware may include ASIC(s), field programmable gate array(s) (FPGA(s)), programmable logic device(s), coupled hardware components or combination thereof. In another example, the hardware may include general-purpose processor(s), microprocessor(s), controller(s), digital signal processor(s) (DSP(s)) or combination thereof.

Examples of the software may include set(s) of codes, set(s) of instructions and/or set(s) of functions retained (e.g., stored) in a storage unit, e.g., a computer-readable medium. The computer-readable medium may include SIM, ROM, flash memory, RAM, CD-ROM/DVD-ROM/BD-ROM, magnetic tape, hard disk, optical data storage device, non-volatile storage unit, or combination thereof. The computer-readable medium (e.g., storage unit) may be coupled to at least one processor internally (e.g., integrated) or externally (e.g., separated). The at least one processor which may include one or more modules may (e.g., be configured to) execute the software in the computer-readable medium. The set(s) of codes, the set(s) of instructions and/or the set(s) of functions may cause the at least one processor, the module(s), the hardware and/or the electronic system to perform the related steps.

Examples of the electronic system may include a system on chip (SoC), system in package (SiP), a computer on module (CoM), a computer program product, an apparatus, a mobile phone, a laptop, a tablet computer, an electronic book or a portable computer system, and the communication device 20.

To sum up, the present invention provides a method of handling energy detection in an unlicensed band. Thus, an eNB may perform resource allocation (e.g., scheduling) for the unlicensed band according to a value determined according to the energy detection from the UE. As a result, interference in the unlicensed band can be reduced, and throughout of devices operated in the unlicensed band can be improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device comprising: a storage unit, for storing instructions of:
    detecting energy of a set of subcarriers in an unlicensed band; obtaining a value according to a statistical function of the detected energy, wherein the statistical function comprises a moving average function, and a variable energy value of the statistical function is set to zero if the detected energy is lower than a threshold configured by the network, and the variable energy value of the statistical function is set to one if the detected energy is higher than the threshold: and transmitting a report comprising the value to a network to allow the network to assign resources in the unlicensed band to reduce interference; and a processing means, coupled to the storage unit, configured to execute the instructions stored in the storage unit.

2. The communication device of claim 1, wherein the value is an average of the detected energy or a sum of the detected energy.

3. The communication device of claim 1, wherein the communication device detects the energy of the set of subcarriers in the unlicensed band periodically according to a first period and a second period, wherein the first period is greater than the second period.

4. The communication device of claim 3, wherein the communication device detects the energy of the set of subcarriers in the unlicensed band periodically according to the first period, when the communication device has no ongoing transmission.

5. The communication device of claim 3, wherein the communication device detects the energy of the set of subcarriers in the unlicensed band periodically according to the second period, when the communication device has an ongoing transmission.

6. The communication device of claim 3, wherein the first period and the second period are predetermined or are configured by the network.

7. The communication device of claim 3, wherein the storage unit further stores the instruction of:
    detecting energy of another set of subcarriers in another unlicensed band in a time interval configured by the network.

8. The communication device of claim 1, wherein the storage unit further stores the instruction of:
    resting the value, if a primary cell of the communication device is changed or the communication device performs a cell selection.

9. The communication device of claim 1, wherein the storage unit further stores the instruction of:
    keeping the value, if a primary cell of the communication device is not changed after the communication device leaves a radio resource control (RRC) connected mode.

10. The communication device of claim 1, wherein the report comprises at least one value, and the storage unit further stores the instructions of: detecting at least one energy of at least one set of subcarriers in the unlicensed band; and
    obtaining the at least one value according to the statistical function of the at least one detected energy.

11. The communication device of claim 1, wherein the report comprises a measurement identity for the set of subcarriers.

12. The communication device of claim 1, wherein the report is transmitted to the network, if the value is greater than a threshold configured by the network.

13. The communication device of claim 1, wherein the report is transmitted to the network, if the value is lower than a threshold configured by the network.

14. The communication device of claim 1, wherein the report is transmitted to the network, if the value is greater than a sum of an offset and another value, wherein the another value is obtained according to the statistical function of another detected energy of another set of subcarriers in the unlicensed band.

15. The communication device of claim 1, wherein the report is transmitted to the network, if the value is lower than a first threshold and another value obtained according to the statistical function of another detected energy of another set of subcarriers in the unlicensed band is greater than a second threshold.

* * * * *